US009686792B2

(12) United States Patent
Jetcheva et al.

(10) Patent No.: US 9,686,792 B2
(45) Date of Patent: Jun. 20, 2017

(54) MULTI-CHANNEL ASSIGNMENT METHOD FOR MULTI-RADIO MULTI-HOP WIRELESS MESH NETWORKS

(71) Applicant: Firetide, Inc., Campbell, CA (US)

(72) Inventors: Jorjeta Gueorguieva Jetcheva, Los Gatos, CA (US); Sivakumar Kailas, San Jose, CA (US); Sachin Kanodia, San Jose, CA (US); Mohan Natarajan, San Ramon, CA (US)

(73) Assignee: Firetide, Inc., Campbell, CA (US)

( * ) Notice: Subject to any disclaimer, the term of this patent is extended or adjusted under 35 U.S.C. 154(b) by 0 days.

(21) Appl. No.: 14/471,248

(22) Filed: Aug. 28, 2014

(65) Prior Publication Data

US 2015/0201415 A1 Jul. 16, 2015

Related U.S. Application Data

(63) Continuation of application No. 12/404,166, filed on Mar. 13, 2009, now Pat. No. 8,824,380, which is a continuation of application No. PCT/US2007/078920, filed on Sep. 19, 2007.

(60) Provisional application No. 60/826,176, filed on Sep. 19, 2006.

(51) Int. Cl.

*H04W 72/04* (2009.01)
*H04W 28/08* (2009.01)
*H04W 72/08* (2009.01)
*H04W 84/18* (2009.01)

(52) U.S. Cl.

CPC ..... *H04W 72/0453* (2013.01); *H04W 28/085* (2013.01); *H04W 72/085* (2013.01); *H04W 72/0486* (2013.01); *H04W 72/082* (2013.01); *H04W 84/18* (2013.01)

(58) Field of Classification Search

CPC .......... H04W 72/0453; H04W 28/085; H04W 72/085; H04W 84/18; H04W 72/082; H04W 72/0486

See application file for complete search history.

(56) References Cited

U.S. PATENT DOCUMENTS 7,453,804 B1 * 11/2008 Feroz .................. H04L 12/5693 370/229
7,941,149 B2 * 5/2011 Wang .................. H04L 12/5695 370/235
8,639,819 B2 * 1/2014 Pohja .................. H04M 1/7253 370/329
8,824,380 B2 9/2014 Jetcheva et al.
2004/0090943 A1 5/2004 da Costa

OTHER PUBLICATIONS

Intellectual Property India, First Examination Report, India Patent Application No. 187 4/DELNP/2009, Mar. 12, 2015, 2 pages.

* cited by examiner

*Primary Examiner* — Mohammad Anwar
(74) *Attorney, Agent, or Firm* — PatentVentures; Bennett Smith; Korbin Van Dyke

(57) ABSTRACT

Techniques are described for automatically determining quasi-static per-link channel assignments for each radio in multiple-hop mesh networks having nodes with two or more radios and where only a small number of channels is available for use in the network. The method optimally assigns the channels to the radios of all of the nodes in the network so as to achieve the lowest interference among links and the highest possible bandwidth.

23 Claims, 3 Drawing Sheets

MULTI-CHANNEL ASSIGNMENT METHOD FOR MULTI-RADIO MULTI-HOP WIRELESS MESH NETWORKS

CROSS REFERENCE TO RELATED APPLICATIONS

Benefit claims for this application are made in the accompanying Application Data Sheet. To the extent permitted by the type of the instant application, this application incorporates by reference for all purposes the following applications, all owned by the owner of the instant application:

- U.S. Non-Provisional application Ser. No. 12/404,166, filed Mar. 13, 2009, first named inventor Jorjeta Jetcheva, and entitled A MULTI-CHANNEL ASSIGNMENT METHOD FOR MULTI-RADIO MULTI-HOP WIRELESS MESH NETWORKS, and
- U.S. PCT Application Serial No. PCT/US2007/078920, filed Sep. 19, 2007, first named inventor Jorjeta Jetcheva, and entitled A MULTI-CHANNEL ASSIGNMENT METHOD FOR MULTI-RADIO MULTI-HOP WIRELESS MESH NETWORKS, and
- U.S. Provisional Application Ser. No. 60/826,176, filed Sep. 19, 2006, first named inventor Jorjeta Jetcheva, and entitled A MULTI-CHANNEL ASSIGNMENT METHOD FOR MULTI-RADIO MULTI-HOP WIRELESS MESH NETWORKS.

BACKGROUND

Field

Advancements in multi-radio mesh networks are needed to provide improvements in performance, efficiency, and utility of use.

Related Art

All references cited herein (if any), including patents, patent applications, and publications, are hereby incorporated by reference in their entireties, whether specifically incorporated or not, for all purposes.

Multi-radio mesh networks are becoming increasingly more popular in commercial deployments since they have a higher potential traffic carrying capacity than single radio networks. Each wireless interface (or radio) of a mesh node can be tuned to a different channel and can be used in parallel with the other wireless interfaces of the node. In an ideal scenario, a node with N wireless interfaces would have N times the capacity of a node with a single wireless interface. When a network of nodes with a single radio is compared to the same network of nodes with N radios, the capacity of the second network may increase by more than N over that of the first network due to channel assignments that reduce interference among nearby links and multi-hop degradation.

Mesh networks tend to have a dense topology, which is intended to increase their redundancy. This enables fast recovery when a node fails, through the use of backup forwarding paths. The density of the topology however, increases the interference in the network, and makes an optimal channel assignment difficult, especially when a small number of radios and channels are available.

To perform channel assignment in a mesh network, we could simply select N channels and assign each to the N radios of each node. However, such a channel assignment makes no attempt to reduce wireless interference in the network or improve performance even further, which is possible due to the presence of multi-radio nodes. Interference in the wireless environment spans a greater distance than the transmission range of a wireless device (typically interference range is assumed to be twice the nominal transmission range) and as a result, to achieve maximum throughput on a link, all nodes that are within the interference range of that link (typically assumed to be those that are 2 wireless hops away) should be configured to channels different from the ones on the link.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the operations of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction may include Example Combinations that tersely summarize illustrative systems and methods in accordance with the concepts taught herein. As is discussed in more detail in the Conclusions, the invention encompasses all possible modifications and variations within the scope of the issued claims.

DETAILED DESCRIPTION

Figure 1:
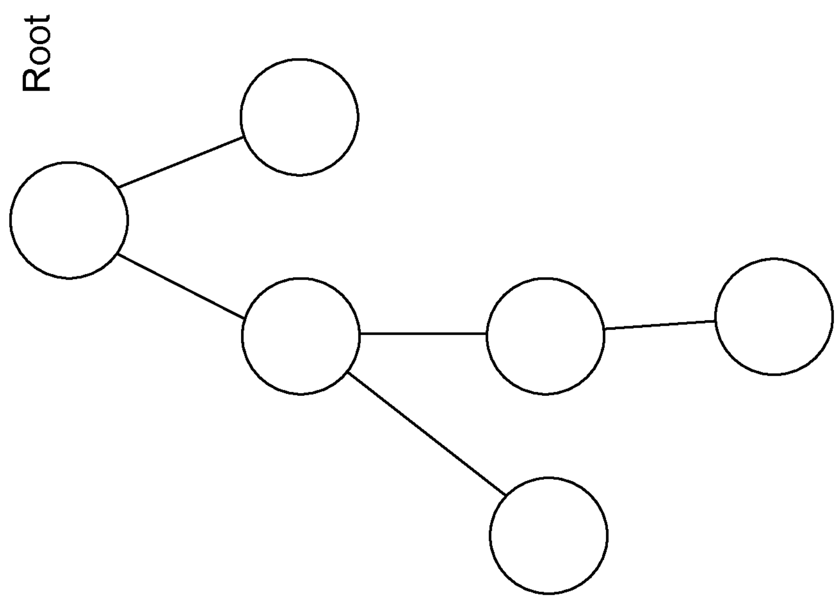
FIG. 1 illustrates a tree wherein: each node has one path to the root; the root is the parent node for all nodes directly connected to it, and they are its child nodes.

A detailed description of one or more embodiments of the invention is provided below along with accompanying figures that illustrate the principles of the invention; the invention is described in connection with the embodiments.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

TERMS

Elsewhere herein terms are used to describe selected elements and aspects of various embodiments and implementations. Usage examples for selected terms are provided in the immediately following paragraphs. However, the terms should be interpreted in the context of the entire specification, and not in isolation. Furthermore, the terms are not necessarily mutually exclusive and multiple terms potentially may be applicable to a given component or process, as in general a component or process can have multiple identities or functions, particularly when considered from different perspectives. Unless expressly identified as being publicly or well known, mention herein of techniques and concepts, including for context, term definitions, or comparison purposes, should not be construed as an indication that such techniques and concepts are previously publicly known or otherwise part of the prior art.

Node: An example of a node is an electronic device.

Packet: An example of a packet is that nodes communicate information to each other that is subdivided into packets.

Link: An example of a link is a conceptual representation of the ability of two (or more) nodes to communicate with each other. A link may be wired (the nodes being connected by a physical medium for carrying information such as electrical or optical interconnect) or wireless (the nodes being connected without a physical medium, e.g., via radio technology).

Path/Route: An example of a path/route is a sequence of one or more links.

Path Metric: An example of a path metric is a number that reflects the desirability of a path. For example, the number of links, e.g., the hop count of a path, is one possible metric. Paths with a lower hop count have advantages over paths with a higher hop count. The advantages include less resource usage (as there is reduced forwarding) and less likelihood of lost packets (as there are fewer chances for loss before packets reach respective destinations).

Best Path: An example of a best path is an ordered list of nodes that when transited (in order) by a packet result in an efficient traversal from a source to a destination, according to predetermined criteria. Since parameters and operating conditions vary over time, any best path is also a "known" best path; e.g. it is based on criteria evaluated at a particular point in time, and at a different point in time a different best path may be available. Best paths may also be considered to be "most nearly optimal" according to one or more metrics as measured with respect to a routing protocol responsible for determining the best paths.

Network: An example of a network is a set of nodes that are enabled to communicate with each other via any combination of wired and wireless links.

Mesh Network: An example of a mesh network is a set of nodes that self-organize into a multi-hop network. In some usage scenarios the mesh network has limited resources (e.g. available bandwidth, available computational power, and available energy).

Multi-Mesh Network: An example of a multi-mesh network is a set of interconnected meshes appearing to operate as a single network from a perspective of a user of resources provided by the multi-mesh network.

Shared Access Network: An example of a shared access network is a network such that a packet transmitted by any node is overheard by all other nodes in the network. An example implementation of such a network is an 802.3 LAN.

Ingress Mesh: An example of an ingress mesh is a mesh where a packet enters a multi-mesh.

Egress Mesh: An example of an egress mesh is a mesh where a packet exits (or leaves) a multi-mesh.

Ingress Mesh Node: An example of an ingress mesh node is a node where a packet enters a mesh; e.g. the node forwarding the packet from a non-mesh link onto a mesh link/network.

Egress Mesh Node: An example of an egress mesh node is a node where a packet exits a mesh; e.g. the node forwarding the packet from a mesh link onto a non-mesh link/network.

Mesh Bridge (Node): An example of a mesh bridge is a node that is simultaneously participating in more than one mesh network at a time; e.g. the node is coupled to at least two mesh networks at once. Bridge nodes enable nodes connected on a first mesh (or that are part of the first mesh) to communicate with nodes connected on a second mesh (or that are part of the second mesh).

(Mesh) Bridge Link: An example of a mesh bridge link is a link between two bridge nodes (each being coupled to a respective mesh) used to forward traffic between the two meshes.

Ingress Bridge Node: An example of an ingress bridge node is the mesh bridge where a packet exits (or leaves) an ingress mesh.

Egress Bridge Node: An example of an egress bridge node is the mesh bridge where a packet enters an egress mesh.

Mesh Portal: An example of a mesh portal is a node that is part of a mesh network and is also connected to another (shared access) network. Mesh portals enable nodes connected to the mesh, or that are part of the mesh, to communicate with nodes that are part of the shared access network, or that may be reached through the shared access network. In some embodiments the mesh network appears to outside networks as a transparent layer-2 transport, i.e. a packet injected into the mesh at one portal exits the mesh at another portal unmodified.

Ingress Mesh Portal: An example of an ingress mesh portal is the portal at which a packet enters a mesh, e.g., the portal that forwards the packet from a non-mesh link/network onto a mesh link/network.

Egress Mesh Portal: An example of an egress mesh portal is the portal at which a packet exits the mesh, e.g., the portal that forwards the packet from a mesh link/network onto a non-mesh link/network.

Wired Mesh Portal: Most traffic enters and exits the network through a (set of) (wired) mesh portal(s). The vast majority of traffic in a mesh network tends to be between one of the mesh nodes and the wired mesh portal(s).

Mesh Client Interface: An example of a mesh client interface is an interface (that is part of a node of a mesh network) for coupling to a client device.

Mesh Network Gateway Interface (mesh NGI): An example of a mesh NGI is a node that is part of a mesh network (e.g., has an interface configured to be part of the mesh network) and is also connected to another network (e.g., has an interface configured to be on the other network). Mesh NGIs enable nodes connected to a mesh network, or that are part of the mesh, to communicate with nodes that are part of a shared access network, or that may be reached through the shared access network. In some embodiments the mesh network appears to outside networks as a transparent layer 2 transport: a packet injected into the mesh at one NGI exits the mesh at another NGI or Client Interface unmodified.

Ingress Mesh Interface: An example of an ingress mesh interface is an interface at which a packet enters a mesh, e.g., the interface that forwards the packet from a non-mesh link onto a mesh link/network.

Egress Mesh Interface: An example of an egress mesh interface is the interface at which a packet exits the mesh, e.g., the interface that forwards the packet from a mesh link onto a non-mesh link/network.

Unicast: An example of unicast is communication between two nodes.

Broadcast: An example of broadcast is communication from one node intended to reach a plurality of nodes. In some usage scenarios the plurality of nodes includes all nodes on a network. In some scenarios a broadcast may not reach all intended nodes (due to packet loss, for example).

Flood: An example of a flood is a broadcast sent by a node that is in turn rebroadcast by every other node receiving the broadcast, thus potentially reaching all nodes in a network.

Routing Protocol: An example of a routing protocol is a set of mechanisms implemented on each node in a mesh network, wherein the mechanisms serve to discover information about the network and enable each node on the network to communicate with other nodes of the network, even when the other nodes are multiple hops away from the respective node.

Path Accumulation: An example of path accumulation is when each node forwarding a packet adds its respective address to the packet.

Non-degrading path: A path which does not contain any links using the same channel that are close enough to each other to interfere, and thus has no capacity-reducing interference along it.

Neighbor-to-interface-assignment: When a node has multiple interfaces and one or more of its neighbors can be reached through more than one interface, we may have to decide which interface they should be reachable from as it may not be necessary to keep the reachability to them through all possible interfaces.

We use the terms "radio" and "wireless interface" interchangeably.

Channel Assignment Considerations

An approach is taught herein for automatically determining quasi-static per-link channel assignments for each radio in a multi-radio multiple-hop mesh networks. To appreciate the approach, we first present the following considerations and constraints that are relevant to channel assignment in such networks:

1) Generally it is beneficial that no radios are left unassigned and no radios are assigned to the same channel or nearby channels that interfere because then they would degrade each other's performance.
2) Generally it is beneficial that the channels are assigned to wireless interfaces in a manner other than randomly. It is further generally beneficial that the channels are assigned such that the network remains connected. For example, if node A and node B are reachable on wireless interfaces $I_{A1}$ and $I_{B1}$ respectively, then $I_{A1}$ and $I_{B1}$ should be assigned the same channel, so that node A and node B remain connected to each other. We assume that it is sufficient to maintain connectivity between a pair of nodes only along a single pair of interfaces (wireless or wired) even if they have the ability to reach each other using multiple of their interfaces when all interfaces are tuned to the same channel.
3) Each node may have multiple neighbor nodes in the mesh to which it needs to be connected wirelessly, but it may have less wireless interfaces than neighbors. This means that generally it is beneficial for one or more radios to be used to communicate with more than one other node each and thus the bandwidth on some radios is going to be shared among multiple nodes. Not only does this reduce the achievable bandwidth but it also creates an additional challenge: the channel assignment method now needs to consider which neighbors to assign to which of a node's wireless interfaces so that it can achieve the best performance. We will refer to this problem as the "neighbor to interface assignment problem".
4) Generally it is beneficial for channel assignment to take into account interference within several hops of each link so that traffic sent along a path does not interfere with itself, i.e., multi-hop paths should be non-degrading.
5) There are additional practical constraints that significantly increase the complexity of the channel assignment problem:
   a) The number of radios is typically limited to 2 or 3 in part due to cost reasons and in part because the number of channels is limited due to government regulations. In view of the small number of available channels, having more radios per node would only increase interference across the networks because the channel assignment method would be forced to repeat a channel more often when there are more radios to assign per node.
   b) Links may have different metrics so the assignment has the power to affect how much bandwidth a given node gets based on which links are used to communicate with each neighbor and which links experience more interference than others (due to repetitions of channels within interference range).
   c) In a practical deployment, different nodes may have different numbers of radios, so the method needs to take that into account.
6) The solution to the channel assignment problem needs to be computationally feasible. Otherwise, it would not be practical to implement in a real system.

In view of the above considerations, our approach optimizes the overall channel assignment based at least in part on choosing which links will experience more interference than others. In selecting an interfering link assignment we bias the overall channel assignment as follows:

a) We attempt to create a non-interfering (or non-degrading) assignment along the paths from each node towards the main point of entry and exit for mesh traffic, e.g., the wired mesh portal, or at least along the best path from each node towards the wired mesh portal. When multiple portals exist, in at least some embodiments we treat them as one virtual portal. We call the portal or virtual portal the root of the assignment.
b) For purposes of the channel assignment, we conceptually reduce the mesh network topology, such that the topology still preserves the important connectivity in the network and the fast failover recovery, but such that the topology reduction enables us to generate an assignment that results in a higher capacity.

Channel Assignment Method Overview

Out channel assignment method for wireless multi-radio multi-hop mesh networks is able to address the channel assignment problem in one of its most challenging forms: multi-radio mesh networks with nodes with two or more radios, and where only a small number of channels is available for use in the network. We will first describe the solution in the context of two radios since this is the most challenging scenario, and then describe how the assignment works when there are more than two radios. We assume that the network can have an arbitrary size and density (number of neighbors per node). For illustrative purposes, we assume that a channel along a path can be repeated for nodes that are 4 links apart, i.e., along a chain of nodes, the 5th link can have the same channel assignment as the 1st link, without interfering with it. This matches the interference characteristics of existing wireless deployments.

We below describe a centralized version of the method. In other embodiments the assignment is computed in a distributed fashion. We refer to the machine that computes the centralized assignment as the Multi-Channel Controller (MCC). Once the assignment is computed, it is applied to the network, causing the network nodes to tune to the channel that was computed for them.

Described in greater detail further below, the channel assignment method of an illustrative embodiment has the following 4 phases:

Phase 1: Topology Discovery. Before we make the channel assignment, we discover the topology of the mesh and its properties. In particular, we want to know what nodes each node is connected to and the characteristics of the links to these neighbor nodes.

Phase 2: Topology reduction. Once we have discovered the topology and characteristics of the links in the topology, we are in a better position to decide what links and paths are more important than others and what portion of the topology is worth preserving. In the topology reduction stage an attempt is made to eliminate some links from the topology that are not essential for connectivity and in so doing reduce the density of the network conducive to deriving an assignment with less interference and possibly no interference.

Phase 3: Topology balancing. The channel assignment gives us control over the topology since even if two nodes can reach each other when their radios are tuned to the same channel, they would not be able to reach each other if their radios are tuned to different channels. We can thus use the assignment to control the topology so as to extract the maximum capacity from it. In particular, in the topology balancing phase, we selectively make some choices about where each node should be attached to the topology, when there are multiple places in which it can do so, in order to distribute the potential traffic load more evenly across the network.

Phase 4: Channel selection. In this stage we perform the channel selection for each link in the network such that we try to have at least one non-degrading path between the root and each node in the network. Secondarily, we try to reduce the interference among neighboring paths as much as possible.

This channel assignment method creates non-interfering paths between each node and the root (e.g., the (virtual) wired portal), and reduces the interference between neighboring/parallel paths, balancing the network capacity among nodes and balancing the expected load in the network, and overall maximizing performance. Our method works in networks with both omni- and directional antennas.

Our method performs a topology reduction and balancing to optimize the topology prior to the channel selection. The topology reduction is unique as it works with multi-radio nodes and selects the best path from each node to the root based on network measurements, and works for networks with both omni- and directional antennas. The topology balancing is unique because it uses both measured performance of the links in the network and expected load into account, where the load calculation is based on a specialized metric, which incorporates the number of dependent nodes per node.

The channel selection itself takes into account not only the virtual links in the topology (those that would exist if they endpoints were on the same channel) but also the physical links in the topology and tries to pick channels that minimize the interference in the network in addition to providing a non-degrading path to each node.

In some embodiments a unique channel assignment method recovery mechanism is implemented wherein each node records its potentially reachable neighbors that may be on other channels (e.g., the MCC is adapted to send this information once the assignment is computed), and when disconnection occurs, the node is adapted to immediately switch to the channel of one of these neighbors (e.g., the one that provides the best connectivity to the root) and reconnect to the network.

In some embodiments, multi-hop routing information is used to determine which node to select as parent to the root. Using only 1-hop link level information (rather than multi-hop routing information) may lead to the formation of loops in the topology where some nodes are connected to each other but not to the root in cases where information on connectivity to the root is not propagated in a timely manner, which is a likely scenario in a network and especially in a wireless network as there are more packet losses.

Example Combinations

In concluding the introduction to the detailed description, what follows is a collection of illustrative embodiments, including at least some explicitly enumerated as "ECs" (Example Combinations), providing supplementary description in a somewhat informal and terse format to highlight a variety of embodiment types in accordance with the concepts taught herein; these examples are not meant to be mutually exclusive, exhaustive, or restrictive; and the invention is not limited to these highlighted embodiments but rather encompasses all possible modifications and variations within the scope of the claims.

EC1) A method of determining channel assignments for each radio in a multi-radio multiple-hop mesh network, the network being comprised of nodes and radio-to-radio links between the nodes, the method comprising:

Determining the topology of the network;

Reducing the network topology;

Balancing the network topology; and

Selecting a channel for each radio.

EC2) The method of EC1, further including:

Measuring predetermined attributes of the network; and

Wherein the reducing includes selecting the best path from each node to the root based at least in part on the network measurements.

EC3) The method of EC1, further including:

Measuring performance of each link;

Calculating the expected load on each link; and wherein the balancing is based at least in part on the measured performance of each link and the expected load on each link.

EC4) The method of EC3, wherein the load calculation is based at least in part on the number of dependent nodes per node.

EC5) The method of EC1, wherein the selecting tries to pick channels that minimize the interference in the network.

EC6) The method of EC1, wherein the selecting tries to provide a non-degrading path to each node.

EC7) The method of EC1, wherein the selecting is based at least in part on virtual links and physical links in the topology.

EC8) The method of EC1, further including:

Recording by each node the potentially reachable neighbors that may be on other channels.

EC9) The method of EC8, further including:

When a node is disconnected from the network, reconnecting the node to the network by switching to the channel of one of the previously recorded neighbors.

EC10) The method of EC8, further including:

When a node is disconnected from the network, reconnecting the node to the network by switching to the channel of the previously recorded neighbor that provides the best connectivity to the wired portal.

EC11) The method of EC9, wherein the switching is immediate.

EC12) The method of EC1, wherein the network uses omni-directional antennas.

EC13) The method of EC1, wherein the network uses directional antennas.

EC14) The method of EC1, wherein the selecting attempts to create a non-interfering assignment along a best path from each node towards a wired mesh portal.

EC15) The method of EC1, wherein the selecting attempts to create a non-interfering assignment along a best path from each node towards a virtual portal, the virtual portal conceptually representing multiple wired mesh portals.

EC16) A computer readable medium having a set of instructions stored therein which when executed by a processing device causes the processing device to perform procedures comprising:

determining the topology of a multi-radio multiple-hop mesh network, the network being comprised of nodes and radio-to-radio links between the nodes;

reducing the network topology;

balancing the network topology; and selecting a channel assignment for each radio.

EC17) The computer readable medium of EC16, wherein the determining, reducing, balancing, and selecting are carried out in a centralized manner by a multi-channel controller.

EC18) The computer readable medium of EC17, the procedures further comprising the multi-channel controller distributing the channel assignments.

EC19) The computer readable medium of EC17, the procedures further comprising the multi-channel controller distributing node-specific information to each node, the node-specific information comprising a list of neighbors and channels.

EC20) The computer readable medium of EC17, the procedures further comprising the multi-channel controller receiving notifications from the nodes regarding parent changes.

EC21) The computer readable medium of EC16, wherein the determining, reducing, balancing, and selecting are carried out in a distributed manner by at least some of the nodes.

EC22) The computer readable medium of EC16, wherein the selecting attempts to create a non-interfering assignment along a best path from each node towards a wired mesh portal.

EC23) The computer readable medium of EC16, wherein the selecting attempts to create a non-interfering assignment along a best path from each node towards a virtual portal, the virtual portal conceptually representing multiple wired mesh portals.

EC24) A multi-channel controller, comprising:

means for determining the topology of a multi-radio multiple-hop mesh network, the network being comprised of nodes and radio-to-radio links between the nodes;

means for reducing the network topology;

means for balancing the network topology; and means for selecting a channel assignment for each radio.

EC25) The multi-channel controller of EC24, wherein the multi-channel controller is one of the nodes of the mesh network.

Particular Embodiments

Phase 1: Topology Discovery

Figure 3:
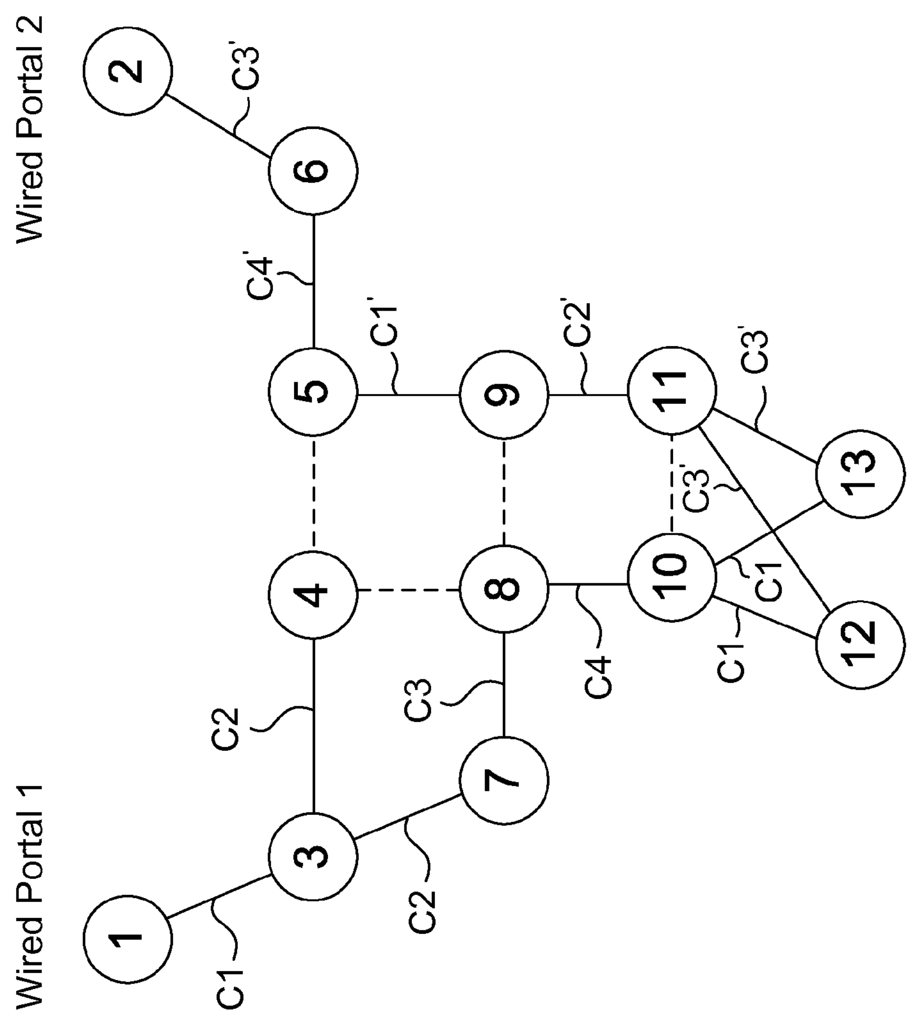
FIG. 3 illustrates an example channel selection.

First we designate the wired mesh portal through which the mesh is connected to the wired infrastructure as the root of the topology discovery and channel assignment. Whenever there are multiple wired portals onto the same wired network, the root of the assignment is a virtual portal to which the physical wired portals are virtually connected through direct links. These links are ignored by the channel assignment method. FIG. 3 illustrates a mesh network with multiple wired portals.

In some embodiments, the root discovers the topology by first discovering its neighbors and then each of the neighbors discovers its own neighbors, etc. In performing this discovery process all nodes are configured to have all of their wireless interfaces on the same channel. After this initial discovery, in some embodiments various properties of each link are selectively measured and reported to the root. The properties of the link selectively reported include at least one of: link bandwidth, lossyness, and signal strength. We will refer to the overall measured properties of a link as a link metric. In some embodiments, the measurements use bidirectional traffic along the link. It is beneficial that when the metrics of a link is measured, there is no traffic on the same channel on other links, in order to isolate the effects of interference among the links from the measurement. To increase the likelihood that the measurement is also independent of outside interference, in some embodiments each measurement is selectively repeated along multiple channels and the best metric reported. During these measurements, in some embodiments we record what channels experience interference from outside sources in certain areas of the network, and take that into account when selecting channels.

The link measurements have to be performed one by one in order for the measurements not to interfere with each other, or in parallel but on non-interfering channels. In some embodiments, to ensure that only one link at a time is measured, we use a Depth-First-Search (DFS) traversal on the network. The DFS traversal is configurable to start at multiple nodes simultaneously and have an independent set of channels used by each starting point, to avoid interference between any two or more measured links.

At the end of this phase, we have the metrics for all links in the network.

Phase 2: Topology Reduction

In at least some 2-wireless-interface embodiments, at each node on a directed path, one wireless interface is used to communicate with a prior node on the path, and the other wireless interface is used to communicate with a later node on the path. This approach avoids multi-hop degradation along the path created when a node uses the same wireless interface to communicate along the links to the nodes before it and after it in the path.

We employ a graph theoretic tree, where the tree is rooted at the root of the assignment (e.g., a (virtual) wired portal) and each node uses one wireless interface to connect to a parent node towards the root, and another wireless interface to allow other nodes (its child nodes) to connect to it and achieve connectivity to the root through it. FIG. 1 illustrates a tree wherein each node has one path to the root. The root is the parent node for all nodes directly connected to it, and they are its child nodes. These nodes in turn are parent nodes for the nodes directly connected to them, etc. By attempting to preserve a single route to the root, this phase generally results in reduction of the physical topology of the network. In at least some embodiments having 3 or more radios available at a node, our method attempts to provide multiple routes to the root. In at least some other embodiments this attempt is not made, but our method does not preclude the existence of multiple routes to the root.

Below are the operations to generate a tree from the topology that was discovered during the Topology Discovery stage:

- Based on the measured link metric properties during the Topology Discovery stage, compute the best path metric from the root of the assignment to each node in the network.
- In this phase we also do the interface-to-neighbor assignment (such that the interface used to communicate with a parent node is used by as few other (child) nodes as possible; using the same wireless interface for both a node's parent and some of its children cannot always be avoided when directional antennas are present).
- The path metric is computed as the highest minimum/bottleneck link metric on the path to the root (we assume no degradation because this is hopefully what we will have after the assignment is done), along with the lowest wireless hop count and the lowest overall hop count (to distinguish wireless and wired hops). Nodes who depend on a node with 1 wireless interface to connect to the root or whose connection to a parent node is via its root wireless interface (due to directional antenna constraints), compute the link bandwidth to the 1-wireless-interfaced node as half of the average bandwidth to it and from it to its previous hop.
- In some embodiments each node saves the top 2 parents it has to the root as the metrics are computed.
- In some embodiments the above computation is performed by a slightly modified Dijkstra.

At the end of this phase, we know for each node its best metric to the root of the assignment, and its two best next hops (parents) towards the root.

Phase 3: Topology Balancing

In the Topology Balancing phase an attempt is made to modify the tree built during the topology reduction phase such that the tree becomes more balanced. What this means is that we want to modify the tree such that traffic to/from the root is distributed along the tree to maximize overall performance. To do that some nodes may have to change their primary parent, as that may not produce the most optimal distribution of traffic. The fact that different paths are assigned different channels means that assigning different nodes to different parent nodes effectively isolates them from each other's interference once the channel assignment is done. (Note that if there aren't enough channels to assign different ones to each path, that may not necessarily hold in all cases). The underlying assumptions here are that we want to optimize network performance over the performance of individual nodes, and that each node may generate the same amount of traffic. When deciding which node to assign to each parent node, we compute the weight of each node as the number of nodes that are its children and descendents in general. If the channel assignment is performed once the network has been operational for a while and we know the average flow of traffic through the network, we also have data on the load of individual links that is available for selective use for the balancing.

The balancing is performed bottom up (from leaves to root) in order to take into account the number of nodes that depend on each node to reach the root (the weight of each node). We are balancing the child nodes among their possible parent nodes in order to distribute the bandwidth demands more evenly whenever possible.

Some topology balancing embodiments are implemented using various heuristics. In other embodiments, the topology balancing involves the following logical operations:

- Find all nodes who have no unprocessed descendent nodes and put them in set C
- Create a set P with all of the parents of the nodes in set C. Set P is constructed by going through the neighbor lists of the nodes in C and finding all neighbors that have a better metric to the root than the node in set C that is currently being considered, but only considering parent connections between P's child interfaces and C's root/parent-facing interfaces (since we do not want to change the interface to neighbor assignment here).
- For each node in P, create a set D, which includes all nodes in C for which it is the best next hop towards the root. Nodes that are leaves in the topology are assigned to the D sets of their top two parents, rather than just the top one since they have two available interfaces for connecting to the root.
- For each node in set P, an example metric is the following:
- Compute its weight W=sum of child weights (from set D); (leaf nodes have a weight of 0.5 because they each have two parents).
- Divide its metric to the root by the weight computed above to get the Average Bandwidth per Descendent node (ABD) for the parent.
- Among the possible child allocations for the parents in set P and the children of C, save the one that yields the best metric over all parents, e.g., best average ABD across all parents, or best mean ABD across all parents, or best other metric of choice. In some embodiments different measures of balancing are at least sometimes used, in accordance with predetermined trade-offs between fairness among nodes and overall performance.
- At this point, all nodes in set C have been assigned a parent.
- Go back to the first topology balancing operation.

If as a result of the Topology Balancing phase, a node's primary parent node is no longer its primary parent, then set its secondary parent to be the former primary parent.

Phase 4: Channel Selection

During the channel selection phase, the method computes an assignment for the topology which resulted after the Topology Balancing phase. In computing this assignment an attempt is made to have non-degrading paths (i.e., with no interfering assignments) from the root to each node, and for neighboring paths not to interfere with each other if possible. The assignment can be viewed as starting from a special node (the root) and fanning out therefrom.

Note that the assignment needs to take into account what channels are ok to assign to the two interfaces of the same node—some combinations cause interference and should not be used. All the child nodes of a node are assigned the same channel except if the node is the root and the root is a physical node with two wireless interfaces, in which case some children of the root are assigned to one of its wireless interfaces and others to its other wireless interface.

Once the assignment is computed, communicate to each node its channel assignment and the channel assignments of all of its potential parents towards the root in the physical topology (to facilitate failure recovery) along with the interfaces along which they are reachable If only 2 channels are available, e.g., C1 and C2, assign channels in an alternating sequence as you go away from the root (1 hop away from the root if the root is a virtual wired portal).

Figure 2:
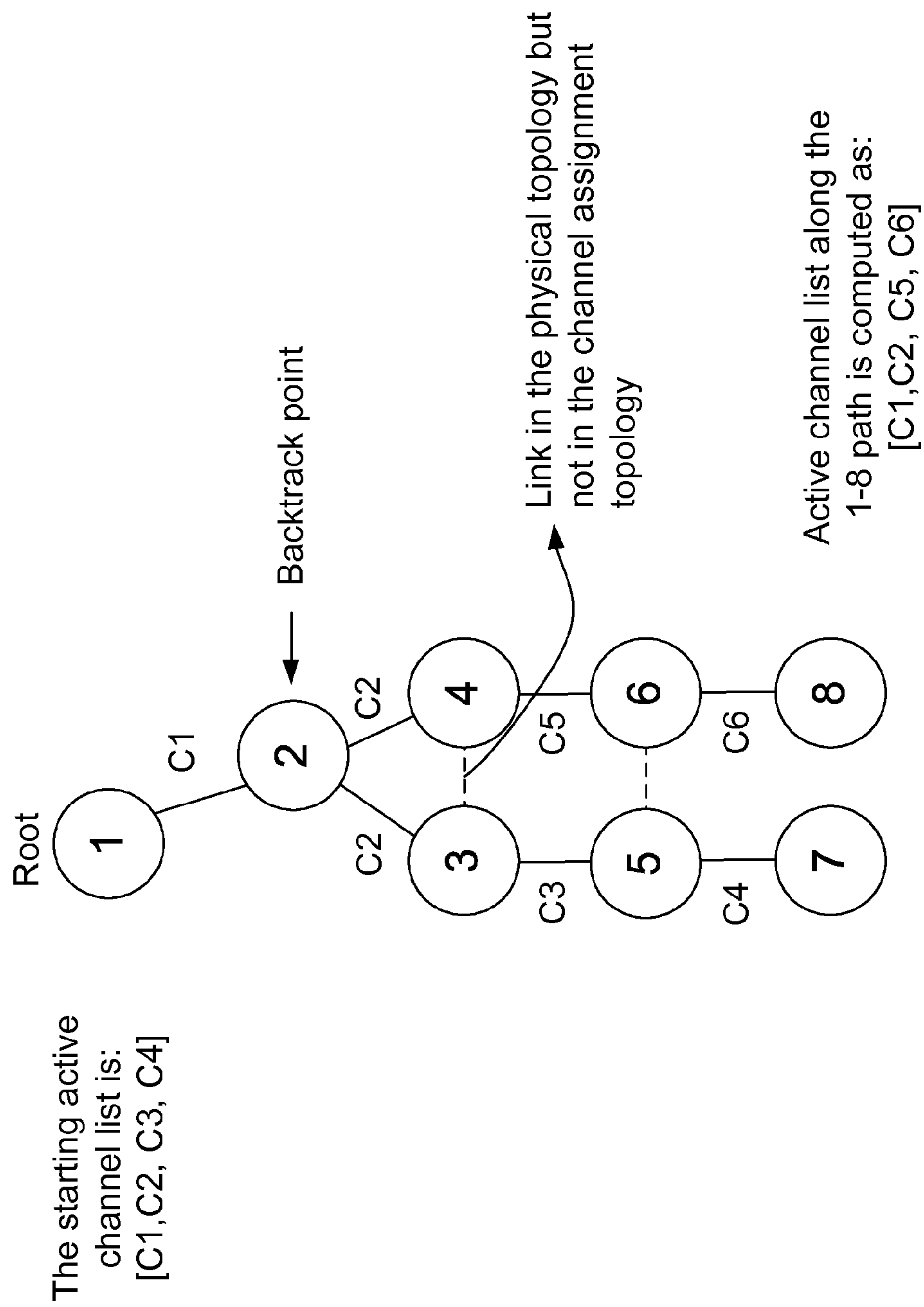
FIG. 2 illustrates a channel section process.

In conjunction with FIG. 2 and FIG. 3 we will now describe an illustrative channel selection process for situations in which more than two channels are available for assignment:

1. Compute a channel list of length 4, e.g., C1-C4. This list is the active channel list, for assigning the first path from the root.
2. Do a DFS along the first child node of the root (if root is virtual, skip the first hop) and assign each node to a channel in the active channel list, starting with C1 for the first node, and then moving onto C2 for the second node, etc.
3. If the node to which it backtracked is less than 4 hops from the root, assign the first link according to the next channel in the active channel list (i.e., same as the previous child of the node) unless we have backtracked to root. In some embodiments, when the DFS traversal backtracks, if we have backtracked to the root, we compute a new channel list unless the root's wireless interfaces have all been assigned. In that case, we move to the next node according to the DFS traversal. Then,
   a. If the next node to assign is still less than 4 hops away from the root (or from the children of the root when the root is virtual), then find out what channels its neighbors have been assigned (neighbors according to the original/physical topology) and also the neighbors of all of its descendent nodes following it up to hop 4 from the root. These are the interfering or conflicting channels.
   b. Come up with a list to assign to the next several nodes up to hop 4 such that the assignment is non-degrading and the assigned channels don't interfere with the neighbor assignment if possible. If not, let the interfering link assignment be as far away from the root as possible, and overlap assignments to parallel links in order to achieve the best redundancy possible, i.e., the nodes at which the assignments overlap have contingent access to good backup paths to the root. Overall, in generating the assignment, an attempt is made to be as diverse as possible; but when no choice is possible, then more diverse closer to the root; and when overlap is unavoidable, overlapping such that the most useful redundancy is achieved.
   c. If redundancy is strongly desired at the expense of performance, it is beneficial for the assignment to provide that each node can reach its second parent in the assignment. To do that when computing the active channel list, we first assign each node along the path to the channel which is required to connect it to all neighbor nodes that view it as their secondary parent. The active channel list computation then assigns the unassigned nodes (some were assigned as a result of the secondary parent assignment above). This does not guarantee that all nodes would be able to reach their secondary parent but greatly increases the redundancy of the network (though at the expense of performance) as the assignment is be forced to incorporate more interference.
   d. In the channel computation, in some embodiments we also take into account what channels are the least likely to suffer from outside interference (as computed during the Topology Discovery phase).
4. The new assignment of the first 4 hops becomes the active channel list for the rest of the assignment along that path from the root
5. Generally it is beneficial that the active channel list not change after the first 4 hops if the assignment only has 4 channels available since unless they repeat in the same sequence, the path will experience multi-hop degradation.
6. It is also beneficial for the method to provide that a leaf node does not end up with 2 wireless interfaces with the same assignment, during the active channel list computation and when we are assigning the channels for hops farther than hop 4.

7. Special case: If a node does not have any descendents, set its free wireless interface to the channel of its second-best parent (as computed during the neighbor to interface assignment and metric to the root) or if no other neighbors, set the wireless interface to the other channel used by its primary parent.

8. Wired mesh links are skipped in the channel selection process as they do not need to be assigned a channel.

Note: If the nodes are sorted according to their coordinates, we get a more optimal assignment because it will proceed from left to right and a path will only have constraints on one side (the left side). In addition, the DFS traversal is configurable to process paths from the root in an order based on what paths are more important, i.e., carry higher load, to achieve a more unconstrained assignment.

Additional Mechanisms

More than two radios: In some embodiments having three radios available at a node, the node uses one radio to connect to its secondary parent. If more than three radios are available, in some embodiments the additional radios are used to increase the connectivity to the root and to provide more connectivity to downstream child nodes by dividing the child nodes among the available child interfaces of a node as well.

Failure Handling: When a node loses its connection to its parent node to the root, it checks for a new parent on the same channel and if it cannot find one it then looks for one on different channels (based on its list of neighbors and channels received from the MCC during the channel assignment process). Nodes who have a new parent, notify the MCC of the re-assignment. The user can then elect to re-optimize later on. It is best to do re-optimizations when the system is not in use to avoid disrupting network services.

In some embodiments, multi-hop routing information is used to determine which node to select as parent to the root. Using only 1-hop link level information (rather than multi-hop routing information) may lead to the formation of loops in the topology where some nodes are connected to each other but not to the root in cases where information on connectivity to the root is not propagated in a timely manner, which is a likely scenario in a network and especially in a wireless network as there are more packet losses.

Distributed Operation: In other embodiments the methods presented above are implemented in a distributed fashion.

CONCLUSION

There are many ways of implementing the invention. It is well established that it is neither necessary, practical, or possible to exhaustively describe every embodiment of the invention. Thus the foregoing embodiments are understood to be merely illustrative, the invention is expressly not limited to or by any or all of the embodiments herein, and the invention encompasses numerous alternatives, modifications and equivalents.

Many variations in construction, arrangement and use are contemplated consistent with the teachings and within the scope of the claims of the issued patent. For example, the degree of parallelism or instantiation (i.e., the dimension, number, or width) of interconnect and function-units, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications, are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (facilitating migration of functions previously in hardware into software) and higher integration density (facilitating migration of functions previously in software into hardware).

Example variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application. Wherever multiple embodiments serve to illustrate variations in process, method, and/or program instruction features, other implementations are contemplated that in accordance with a predetermined or a dynamically determined criterion perform static and/or dynamic selection of one of a plurality of modes of operation corresponding respectively to a plurality of the multiple embodiments.

To provide a thorough understanding the embodiments have been illustrated with detail and environmental context well beyond that required for a minimal implementation of many of aspects of the concepts taught. Variations may omit disclosed components or features without altering the basic cooperation among the remaining elements. Thus the invention may be practiced according to the claims without some or all of these specific details. To the extent that the remaining elements are distinguishable from the prior art, components and features that may be so omitted are not limiting on the concepts taught herein. For the purpose of clarity, technical material that is known in the technical fields related to the invention has not been described in detail so that the invention is not unnecessarily obscured.

Certain choices have been made in the presentation of this disclosure merely for reasons of convenience in preparing the text and drawings. Unless there is an indication to the contrary these choices of convenience should not be construed per se as conveying additional or implicit information regarding the structure or quality of the embodiments illustrated. Illustrative examples of such choices of convenience include: the particular organization or assignment of the designations used for the figure numbering and the particular organization or assignment of the element identifiers (i.e., the callouts or numerical designators) used to identify and reference the features and elements of the embodiments. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims of the issued patent.

What is claimed:

1. A method comprising:

in a particular node of a plurality of nodes operating as a wireless mesh network, discovering ones of the plurality of nodes that are potentially reachable neighbors of the particular node, wherein each of the plurality of nodes has at least one radio and the discovering is via the at least one radio of the particular node, each of the potentially reachable neighbors is within a single radio hop of the particular node, each of the radios is tunable to operate on a corresponding assigned one of a plurality of channels, and the assigned channels are determined based at least in part on the discovering;

in response to the assigned channels, tuning the at least one radio of the particular node to operate on a particular one of the plurality of channels; and in response to disconnection of the particular node from the wireless mesh network, tuning the at least one radio of the particular node to operate on the assigned channel corresponding to the at least one radio of at least a selected one of the potentially reachable neighbors, and wherein the discovering is before the disconnection.

2. The method of claim 1, wherein the assigned channels are formulated in accordance with:

determining topology of the wireless mesh network based at least in part on the discovering;

balancing the topology by choosing attachment points of the plurality of nodes to the topology to more evenly distribute traffic across the wireless mesh network, the balancing comprising computing weights as numbers of child nodes of the plurality of nodes; and determining, in accordance with the balancing, the assigned channels of the radios of the potentially reachable neighbors.

3. The method of claim 1, further comprising, in the particular node, receiving communication of interfaces along which the potentially reachable neighbors are reachable.

4. The method of claim 1, wherein the tuning in response to disconnection of the particular node from the wireless mesh network is selective, and comprises checking for a new parent on the particular channel.

5. The method of claim 4, further comprising checking for a new parent on other than the particular channel, in response to not finding a new parent on the particular channel.

6. The method of claim 1, further comprising providing notification of the assigned channel corresponding to the at least one radio of at least a selected one of the potentially reachable neighbors to an element performing a centralized formulation of the assigned channels.

7. The method of claim 1, wherein the assigned channels are formulated in a centralized fashion.

8. The method of claim 1, further comprising in the particular node, receiving the assigned channels of the radios of the potentially reachable neighbors.

9. The method of claim 1, wherein the response to disconnection of the particular node from the wireless mesh network is performed without requiring a change in configuration by the selected neighbor.

10. A non-transitory machine-readable medium having a set of instructions stored therein that when executed by a processing device cause the processing device to perform and/or control operations comprising:

discovering, with respect to a particular node of a plurality of nodes operating as a wireless mesh network, ones of the plurality of nodes that are potentially reachable neighbors of the particular node, wherein each of the plurality of nodes has at least one radio and the discovering is via the at least one radio of the particular node, each of the potentially reachable neighbors is within a single radio hop of the particular node, each of the radios is tunable to operate on a corresponding assigned one of a plurality of channels, and the assigned channels are determined based at least in part on the discovering;

tuning, responsive to the assigned channels, the at least one radio of the particular node to operate on a particular one of the plurality of channels;

tuning, responsive to disconnection of the particular node from the wireless mesh network, the at least one radio of the particular node to operate on the assigned channel corresponding to the at least one radio of at least a selected one of the potentially reachable neighbors, and wherein the discovering is before the disconnection; and wherein the particular node comprises the processing device.

11. The non-transitory machine-readable medium of claim 10, wherein the assigned channels are formulated in accordance with:

determining topology of the wireless mesh network based at least in part on the discovering;

balancing the topology by choosing attachment points of the plurality of nodes to the topology to more evenly distribute traffic across the wireless mesh network, the balancing comprising computing weights as numbers of child nodes of the plurality of nodes; and determining, in accordance with the balancing, the assigned channels of the radios of the potentially reachable neighbors.

12. The non-transitory machine-readable medium of claim 10, wherein the operations further comprise receiving communication of interfaces along which the potentially reachable neighbors are reachable.

13. The non-transitory machine-readable medium of claim 10, wherein the tuning in response to disconnection of the particular node from the wireless mesh network is selective, and comprises checking for a new parent on the particular channel.

14. The non-transitory machine-readable medium of claim 13, further comprising checking for a new parent on other than the particular channel, in response to not finding a new parent on the particular channel.

15. The non-transitory machine-readable medium of claim 10, wherein the operations further comprise providing notification of the assigned channel corresponding to the at least one radio of at least a selected one of the potentially reachable neighbors to an element performing a centralized formulation of the assigned channels.

16. The non-transitory machine-readable medium of claim 10, wherein the assigned channels are formulated in a centralized fashion.

17. The non-transitory machine-readable medium of claim 10, wherein the operations further comprise receiving the assigned channels of the radios of the potentially reachable neighbors.

18. The non-transitory machine-readable medium of claim 10, wherein the tuning responsive to disconnection of the particular node from the wireless mesh network is performed without requiring a change in configuration by the selected neighbor.

19. An apparatus comprising:

a processing device;

a non-transitory machine-readable medium;

at least one radio;

wherein the at least one radio of the apparatus in part enables the apparatus to operate as a particular node with a plurality of nodes as a wireless mesh network, each of the plurality of nodes having at least one radio;

wherein the at least one radio of the apparatus and each of the radios of the plurality of nodes is tunable to operate on a corresponding assigned one of a plurality of channels; and wherein the processing device executes instructions stored in the non-transitory machine-readable medium to perform and/or control operations comprising:

discovering, with respect to the particular node, ones of the plurality of nodes that are potentially reachable neighbors of the particular node, wherein the discovering is via the at least one radio of the apparatus, each of the potentially reachable neighbors is within a single radio hop of the particular node, and the assigned channels are determined based at least in part on the discovering, tuning, responsive to the assigned channels, the at least one radio of the apparatus to operate on a particular one of the plurality of channels, and tuning, responsive to disconnection of the particular node from the wireless mesh network, the at least one radio of the apparatus to operate on the assigned channel corresponding to the at least one radio of at least a selected one of the potentially reachable neighbors, and wherein the discovering is before the disconnection.

20. The apparatus of claim 19, wherein the tuning in response to disconnection of the particular node from the wireless mesh network is selective, and comprises checking for a new parent on the particular channel.

21. The apparatus of claim 20, further comprising checking for a new parent on other than the particular channel, in response to not finding a new parent on the particular channel.

22. The apparatus of claim 19, wherein the operations further comprise receiving the assigned channels of the radios of the potentially reachable neighbors.

23. The apparatus of claim 19, wherein the tuning responsive to disconnection of the particular node from the wireless mesh network is performed without requiring a change in configuration by the selected neighbor.

* * * * *